Patented Feb. 15, 1949

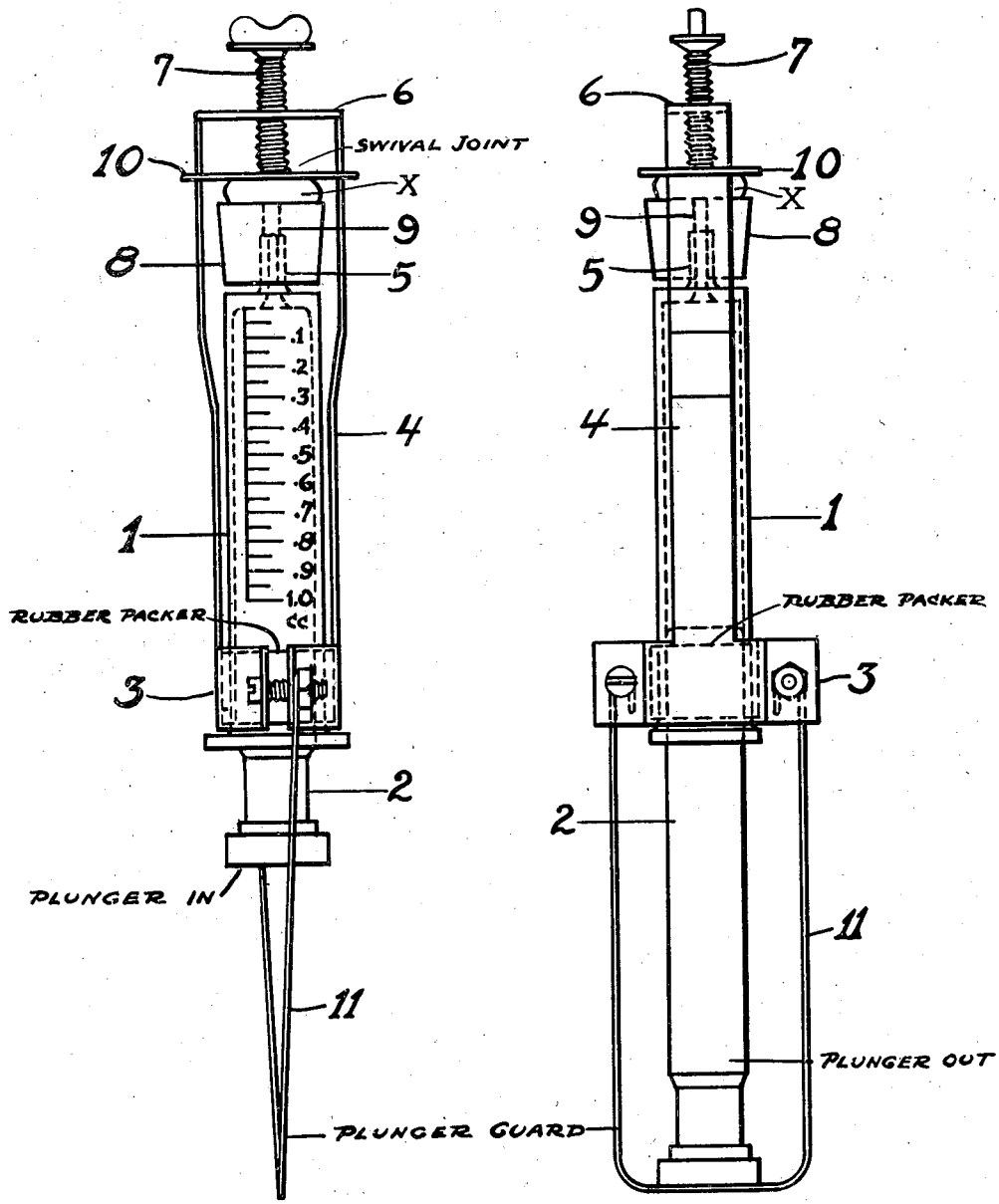

2,462,014

UNITED STATES PATENT OFFICE 2,462,014

MICROPERMEAMETER FOR MEASURING THE PERMEABILITY OF OIL FIELD CUTTINGS

Henry J. Welge, Tulsa, Okla., assignor to Standard Oil Development Company, a corporation of Delaware Application August 23, 1946, Serial No. 692,559

3 Claims. (Cl. 73—38)

The present invention is directed to a device for measuring the permeability of small fragments of solid materials.

In sub-surface geology, in reservoir studies and in the making of geological logs of boreholes, it is frequently desirable to determine the permeability of the material of which a formation is composed. This is preferably done by securing a core of specified dimensions of said material and determining the rate at which fluid under a selected pressure will pass through the core. Frequently, however, such cores are not available and cannot be obtained, the only samples being small fragments. The principal object of the present invention is the provision of a simple device for obtaining a measure of permeability on such fragments.

The nature of the present invention may be more readily understood from the following detailed description of the accompanying drawing in which Fig. 1 is a front elevation of one embodiment of the present invention and Fig. 2 is a side elevation thereof.

Referring to the drawing in detail, numeral 1 designates the cylinder of a conventional hypodermic syringe in which slides a plunger 2. A collar 3 fastened to the cylinder carries a metal bracket 4 extending parallel to and beyond the nozzle 5 of the cylinder. The bracket has a horizontal portion 6 overlying the nozzle 5 and carrying a clamping screw 7.

Fixed to the nozzle is a rubber stopper 8 having a central opening 9 to receive said nozzle with a reasonably tight fit, to prevent leakage of air between the stopper and the nozzle. A fragment X to be tested is placed over the hole in the stopper, covered by a clamping plate 10 carried on bracket 4 and pressed into place by the clamping screw 7. This is done with the plunger 2 preferably in its innermost position. Thus the assembly is held in the position shown and the time required for the plunger to fall a selected distance measured by a stop-watch. The downward movement of the plunger is limited by a loop 11 secured to and depending from the collar 3.

It can be shown that the permeability is inversely proportional to the time required. The constant of proportionality may be approximately determined by calibration of the device, using chips knocked off by means of a hammer from a cylinder whose permeability has been measured by conventional means. By way of illustration, if the hole in the stopper is 3 mm. in diameter and the piston weighs 5 grams, physical theory requires that the relation should be, approximately:

$$K = 400/t$$

where K is the permeability in millidarcies and $t$ is the time required for the piston to fall until 1 cc. of air has passed through the chip.

For chips with higher permeability, a 10 cc. syringe may be used. If such an instrument be assumed with a piston weighing 19 grams, the theoretical equation to be used with it is:

$$K = 9100/T$$

where K is the permeability in millidarcies and T is the time required for 10 cc. of air to flow through the chip.

The device of the present invention does not give an absolutely precise measure of permeability but only an approximate measure thereof, which is adequate for field purposes. The device readily indicates zero permeability, which is an important factor in the evaluation of cuttings.

Two particular novelties in this device are: (1) the constant pressure differential insured by the piston weight which insure that the above indicated equation is true and (2) the admission of the air through a small hole in the conformable rubber stopper which insures the measurement being only slightly dependent upon the size or shape of the chip of rock.

In order to insure smooth and reproduceable operation, the device may be lubricated if necessary. Lubrication may be effected with kerosene. The device may be assumed to be operating properly when the time of fall of the plunger, with the passage 9 open, is less than one second.

Various modifications of the device shown will suggest themselves to those skilled in the art and are contemplated within the scope of the present invention. Likewise, changes in design in which are preserved the operating principles illustrated in the drawing are contemplated.

The nature and objects of the present invention having thus been set forth, what is claimed and desired to be secured by Letters Patent is:

1. A device for measuring the permeability of a fragment of solid material, comprising a hollow cylindrical body member open at each end, a resilient fragment support mounted on one end of said member, there being a passage-way through said support, having an open outer end, and an inner end communicating with the interior of said body member, a plunger, normally filling the interior of said body member, reciprocally movable therein through the other end of the member, a bracket secured to the body member, a clamp carried by said bracket in threaded engagement therewith, movable therein towards said fragment support over the outer end of said passage-way, while exposing a portion of the fragment to the atmosphere, and a plunger stop member carried by said bracket limiting outward movement of the plunger from the body member.

2. A device according to claim 1 in which said body member and plunger are the body and plunger of a hypodermic syringe having a nozzle portion at one end, and said fragment support is a one-hole rubber stopper applied over and engaging the nozzle portion.

3. A device for measuring the permeability of a fragment of a solid material, comprising a hollow cylindrical body member open at each end, a resilient fragment support mounted on one end of said member, there being a passageway through said support, having an open outer end, and an inner end communicating with the interior of the body member, a plunger, normally filling the interior of said body member, reciprocally movable therein through the other end of the member and adapted for withdrawal by gravity, a U-shaped bracket secured to the body member with its leg portions disposed longitudinally with relation to the body member with the base portion of said U-shaped bracket disposed in spaced substantially parallel relation to the outer end of said fragment support, a clamping plate disposed slidably on said bracket leg portions between the fragment support and the bracket base substantially parallel to said elements, a clamping screw threaded through the base of said bracket to engage the clamping plate for compression of a solid material fragment by said plate against the resilient support over the outer end of said passage-way, while exposing a portion of the fragment to the atmosphere, and a plunger stop member carried by said bracket limiting outward movement of the plunger from the body member.

HENRY J. WELGE.

REFERENCES CITED

The following references are of record in the file of this patent:

UNITED STATES PATENTS

| Number | Name | Date |
| --- | --- | --- |
| 1,538,793 | Gallagher et al. | May 19, 1925 |
| 1,905,270 | Egy | Apr. 25, 1933 |
| 2,021,948 | Schopper | Nov. 26, 1935 |